(12) United States Patent  
van Berkel et al.

(10) Patent No.: US 12,498,880 B2
(45) Date of Patent: Dec. 16, 2025

(54) NEURAL NETWORK DEVICE WITH CONFIGURABLE SHARED MEMORY

(71) Applicant: Snap Inc., Santa Monica, CA (US)

(72) Inventors: Cornelis Hermanus van Berkel, Heeze (NL); Lennart Bamberg, Hamburg (DE); Luc Johannes Wilhelmus Waeijen, Haelen (NL)

(73) Assignee: Snap Inc., Santa Monica, CA (US)

( * ) Notice: Subject to any disclaimer, the term of this patent is extended or adjusted under 35 U.S.C. 154(b) by 14 days.

(21) Appl. No.: 18/714,655

(22) PCT Filed: Nov. 30, 2022

(86) PCT No.: PCT/EP2022/083923
§ 371 (c)(1),
(2) Date: May 30, 2024

(87) PCT Pub. No.: WO2023/099603
PCT Pub. Date: Jun. 8, 2023

(65) Prior Publication Data
US 2025/0021259 A1    Jan. 16, 2025

(30) Foreign Application Priority Data

Nov. 30, 2021 (EP) ..................................... 21290079

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ............. G06F 12/0207; G06F 12/0284; G06F 12/0292; G06F 12/0607; G06F 13/1605;
(Continued)

(56) References Cited

U.S. PATENT DOCUMENTS 6,356,991 B1    3/2002   Bauman et al.
6,546,453 B1    4/2003   Kessler et al.
(Continued)

FOREIGN PATENT DOCUMENTS

WO    WO-2023099603 A1    6/2023

OTHER PUBLICATIONS

"International Application Serial No. PCT/EP2022/083923, International Search Report mailed Jan. 31, 2023", 6 pgs.
(Continued)

*Primary Examiner* — Jane W Benner
(74) *Attorney, Agent, or Firm* — Schwegman Lundberg & Woessner, P.A.

(57) ABSTRACT

A neural network device includes a shared physical memory that has a plurality of independently accessible memory sections. The neural network device further includes a data processor core to execute instructions. The instructions include at least one instruction involving multiple memory access operations specifying respective logical memory addresses in a plurality of logical memories. During configuration of the neural network device for a particular application, respective memory sections of the plurality of independently accessible memory sections are assigned to respective logical memories of the plurality of logical memories. In accordance with the configuration, each logical memory address of the respective logical memory addresses is mapped to a physical address by providing an indication of a memory section of the plurality of independently accessible memory sections and a row address within the memory section.

20 Claims, 7 Drawing Sheets

(58) Field of Classification Search
CPC .............. G06F 13/1652; G06F 13/1684; G06F 2212/1008; G06F 2212/1024; G06F 2212/1044; G06F 3/0604; G06F 3/0655; G06F 3/0679; G06F 16/958
See application file for complete search history.

(56) References Cited

U.S. PATENT DOCUMENTS

| | | |
|---|---|---|
| 8,724,423 B1 | 5/2014 | Zhou et al. |
| 2012/0131257 A1 | 5/2012 | Rudosky et al. |
| 2013/0073822 A1 | 3/2013 | Sandel et al. |
| 2014/0082322 A1 | 3/2014 | Loh et al. |
| 2014/0310482 A1 | 10/2014 | Iyer et al. |
| 2018/0285254 A1 | 10/2018 | Baum et al. |
| 2021/0019600 A1* | 1/2021 | Huang ................... G06N 3/063 |
| 2021/0200447 A1* | 7/2021 | Gupta ................. G06F 12/0246 |

OTHER PUBLICATIONS

"International Application Serial No. PCT/EP2022/083923, Written Opinion mailed Jan. 21, 2023", 9 pgs.

"Chinese Application Serial No. 202280085938.0, Voluntary Amendment filed Jan. 7, 2025", w/ English claims, 10 pgs.

"European Application Serial No. 21290079.9, Extended European Search Report mailed Apr. 29, 2024", 11 pgs.

"European Application Serial No. 22822587.6, Response to Communication pursuant to Rules 161(2) and 162 EPC filed Dec. 19, 2024", 26 pgs.

"International Application Serial No. PCT/EP2022/083923, International Preliminary Report on Patentability mailed Jun. 13, 2024", 11 pgs.

"Korean Application Serial No. 10-2024-7021570, Voluntary Amendment Filed Jul. 18, 2025", w/ English Claims, 16 pgs.

"New international patent application in the name of GrAI Matter Labs S.A.S. claiming priority from EP 21290079.9 filed on Nov. 30, 2021", PCT Direct / informal comments filed Nov. 29, 2022, 10 pgs.

Akopyan, Filipp, "True North: Design and Tool Flow of a 65 mW 1 Million Neuron Programmable Neurosynaptic Chip", IEEE Transactions on Computer-Aided Design of Integrated Circuits and Systems, vol. 34, No. 10, (Oct. 2015), 1537-1557.

Davies, Mike, et al., "Loihi: A Neuromorphic Manycore Processor with On-Chip Learning", IEEE Micro, 38(1), (2018), 82-99.

Demler, Mike, "BrainChip Akida is a Fast Learner", [Online]. Retrieved from the Internet: <URL:https://d1io3yog0oux5.cloudfront.net/brainchipinc/files/BrainChip+Akida+Is+a+Fast+Learner.pdf>, (Oct. 28, 2019), 3 pgs.

* cited by examiner

NEURAL NETWORK DEVICE WITH CONFIGURABLE SHARED MEMORY

CLAIM OF PRIORITY

This application is a U.S. national-phase application filed under 35 U.S.C. § 371 from International Application Serial No. PCT/EP2022/083923, filed on Nov. 30, 2022, and published as WO 2023/099603 on Jun. 8, 2023, which claims the benefit of priority to European Patent Application Serial No. 21290079.9, filed on Nov. 30, 2021, each of which is incorporated herein by reference in its entirety.

BACKGROUND

The present disclosure relates to a neural network device.

The present disclosure further relates to a neural network system comprising a neural network device.

The present disclosure still further relates to a neural network method.

A neural network device is designed to perform computations in a manner comparable to the operation of a biological neural network, as present in the brain for example. The neural network device mimics neurons as neural network device elements that are interconnected by a message transmission network. A neural network device element having reached an excited state transmits an output message to the neural network device element with which it is connected analogous to the way in which a biological neuron transmits a spike via its axons to the synapses of receiving biological neurons. In practice respective sets of neural network device element share respective computation and control modules responsible for performing the computational and logic steps to be performed by the neural network device elements. For example, the neural network device is provided as a plurality of processor cores, each having a respective memory unit with respective storage locations for storing a state of respective neural network device elements. A neural network device is typically organized as a plurality of neural network device layers, wherein each neural network device layer comprises a plurality of neural network device elements. The respective states of the plurality of neural network device elements of a neural network device layer together define a feature map.

A processor core for a neural network device needs storage space for mutually different purposes. Examples are event queues for queueing event messages to be exchanged between neural network device elements, state memory for storing respective states of the neural network device elements, weight (synapse) memory to store weight values indicative for weights assigned by a device element to event messages received from another device element or from itself, and connectivity memory to specifying connections between neural network device elements. Also storage space may be required to store delay values indicative for a scheduled delay for transmission of event messages.

Memory access times may be minimized by providing these storage spaces in respective physical memories, so that memory accesses to mutually different purposes can independently take place. Therewith it should be taken into account that mutually different processing applications may involve substantially different memory requirements. For example one application may require a large physical memory for storage of the event queue, while another application may require a large physical memory for storage of the connectivity data.

More specifically, in a large neural network device some processor cores support a (small) fraction of a single network layer, while other processor cores may support multiple (small) layers. Moreover, in lower-indexed layers (at the front-end of the graph) a lot of storage space may be needed to store the neuron states. In some of the higher-indexed layers a substantial storage space is needed to store network parameters for specifying connectivity, and connection weights for example. As an other example, some of the processor cores may require a large amount of storage space to queue incoming events and to avoid overflow. Hence the amount of storage space needed depends on the structure of the network and the nature of the application.

In order to render the data processor device suitable for use with arbitrary applications, a substantial amount of storage space needs to be available for each purpose. This in turn requires a large surface area in an integrated circuit. Moreover, the various physical memories, typically having different sizes lead to an irregular and hence inefficient VLSI floorplan. The resulting floorplan is likely to contain a lot of so-called white space. It is alternatively possible to moderate access times by providing the various storage spaces in a shared multi-port memory. However, the area-costs per bit of multi-ported SRAMs is substantially higher than that of single-ported SRAMs.

SUMMARY

It is an object of the present disclosure to provide a neural network device suitable for use with arbitrary applications while having modest memory requirements.

It is a further object of the present disclosure to provide a neural network method suitable for use with arbitrary applications while having modest memory requirements.

In accordance with the present disclosure a neural network device is claimed herein that comprises a physical memory, a data processor core, a configurable memory mapping unit, a configuration module and a memory-interface module.

The physical memory comprises a plurality of independently accessible memory banks. The data processor core is configured to execute instructions of an instruction set. One or more of these instructions involve multiple memory access operations that specify respective memory addresses in respective logical memories within the physical memory. An instruction may for example specify an operation that updates a state value of a neural network element in response to an event message. This operation requires access to a first storage location where a weight is stored with which the event message is to be weighed, and a second storage location from which it reads the current state and to which it writes the updated state. The first storage location is part of a first logical memory that stores weight data, and the second storage location is part of a second logical memory that stores state data.

The claimed neural network device further comprises a configurable memory mapping unit that maps a logical memory address to a physical address. The physical address includes an indication of a memory bank of the plurality of memory banks and a row address within the indicated memory bank.

The claimed neural network device further comprises a configuration module that configures the configurable memory mapping unit for a particular application. In a configuration respective logical memories are assigned respective sections of the physical memory. The configuration of the configurable memory mapping unit is maintained during run-time, i.e. during execution of the application. In one example the assignment of physical memory sections is fully controlled by an operator. In another example the assignment take place automatically on the basis of a description of the application to be performed. In a still further example the assignment takes place semi-automatically.

As one example, in an application wherein a processor core is used for implementation of (a) lower-indexed layer(s) (at the input side of a neural network) a significant part of the available physical storage space may be configured for storage of neuron states. Generally the memory capacity required for neuron states of (a) higher-indexed layer(s) (at the output side of a neural network) is more modest. Typically for higher-indexed layer(s) a relatively large amount of available storage space may be configured for connectivity data, i.e. data specifying which processor device elements are mutually connected. In a further example, the configuration module that configures the configurable memory mapping unit to configure a relatively large section of the physical memory as a logical memory for queueing incoming events.

The claimed neural network device further comprises a memory-interface module to facilitate memory access operations for mutually different logical memories configured in the physical memory. The memory-interface module receives the memory access requests for reading and/or writing data to/from respective sections to respective logical memories and coordinates access to the respective assigned sections in the physical memory.

Various options are possible for the manner in which the configurable memory mapping unit enables assigning respective sections of the physical memory to respective logical memories. According to one option, the configurable memory mapping unit enables that respective sets of banks of the physical memory are assigned to respective logical memories. In the configuration stage the configuration module configures the configurable memory mapping unit for a particular application by assigning the proper number of banks to each of the respective logical memories. During execution of the application, i.e. during run-time, the memory-interface module facilitates memory access operations for respective logical memories in accordance with the respective sets of banks that were assigned in the configuration phase. Due to the fact that different logic memories are assigned different sets of banks, it is fully avoided that conflicts can occur between memory access operations associated with mutually different logical memories. A same logical memory "port" however may give access to mutually different sets of physical memory banks dependent on the application. During execution, the memory-interface module provides for a proper routing of a memory access operation to the physical memory bank(s) assigned in the configuration stage.

According to another option, the configurable memory mapping unit enables assigning respective address ranges within a bank to respective logical memories. In the configuration stage, the configuration module configures the configurable memory mapping unit for a particular application by assigning a respective address range to each logical memory. During execution of the application, i.e. during run-time, the memory-interface module facilitates memory access operations for respective logical memories in accordance with the respective address ranges that were assigned in the configuration phase. A potential access conflict may occur if memory access operations requesting access to mutually different logical memories sharing the same bank.

To address this situation, the memory interface module comprises an arbitration module to serialize such concurrent bank (load/store) access requests. In an embodiment, a respective buffer is provided for each memory bank to temporarily buffer pending memory access requests. In an example, the arbitration module is configured to prioritizes a load (memory read) request and buffers a store (write) request in case such requests occur concurrently. This renders it possible that the data processor core can directly receive the data indicated by the load request, and can also directly write the data contained in the store request. It is noted that mutually different logical memories may sharing a set of banks. Whereas it is still possible that the access conflicts may occur resulting from concurrent memory access requests the probability that this occurs can be strongly reduced, provided that the number of banks is substantially larger than the number of logical memories.

According to a still further option a hybrid physical memory partitioning is provided wherein mutually different sets of logical memories share mutually different sets of banks. For example a first and a second logical memory share a first set of one or more banks and a third and a fourth logical memory share a second set of one or more banks.

In some embodiments the memory banks of the physical memory are single ported memory units. Whereas multi ported memory units would be applicable too, a reduced silicon footprint is achieved with single ported memory units.

In some embodiments the memory banks are mutually identical memory units. This contributes to a simplified memory control structure.

An even more efficient use of the physical memory is achieved in an embodiment wherein the data processor core is configured to execute a sequence of successive instructions wherein data words located contiguously in a logical memory are accessed. A still further improvement is achieved in embodiments wherein the data processor core is configured to execute an instruction that performs a loading or storing of a plurality of data words in parallel using a single logical memory address.

The present disclosure also provides an improved neural network system that comprises a plurality of neural network devices as described above and further comprises a message exchange network with a respective network node for each neural network device and network links coupling the network nodes. The message exchange network enables the neural network devices to exchange messages. In this manner neural networks can be implemented in an arbitrary scale by mapping respective sections of the neural network to respective neural network devices. Therewith each of the neural network devices can be configured appropriately for the section of the neural network that is mapped thereto.

The present disclosure further provides an improved neural network processing method that comprises a configuration stage and an execution stage.

In the configuration stage a physical memory of a neural network processing device is configured by assigning respective sections of the physical memory to respective logical memories. This operation comprises configuring a memory mapping unit to map respective logical memory addresses to respective physical addresses in a shared physical memory with a plurality of independently accessible memory banks in accordance with that configuration.

In the execution stage, a data processor core of the neural network processing device executes at least one instruction that involves multiple memory access operations specifying respective memory addresses in respective logical memories. The configured memory mapping unit then maps the respective memory addresses in respective logical memories to a corresponding physical memory address. The corresponding physical memory address includes a designation of a memory bank in the physical memory and an address in the memory bank. As specified above, an assigned section may be a set of one or more banks, an address range within a bank or a combination of both.

Advantageously data is laid-out in the logical memories such that typically (but not necessarily always) the load and store operations of P successive instructions involve data words located contiguously in the respective logical memories. The data processor core is configured to execute an instruction wherein data words located contiguously in a logical memory are accessed in a single memory cycle. It is noted that the wording "accessed in a single memory cycle" is understood to mean in the throughput sense rather than in the latency sense. I.e, the data processor core accesses each of the consecutive logical memory addresses in a single cycle, but it may be the case that additional cycles are involved between initiating the a read access and the availability of the read data for further processing.

In an embodiment the memory mapping unit is configurable to allow for loading and storing of P words in parallel using a single address. This renders it possible that the processor core executes an instruction that specifies a single logical memory address. Upon execution of the instruction, the memory mapping unit converts the logical address into a designation of a range of P banks, and the memory-interface module accesses the banks in this range in parallel to load a respective one of the P words from each of these banks. Likewise it may access these banks in parallel to store a respective one of the P words in each of these banks.

BRIEF DESCRIPTION OF THE DRAWINGS

These and other aspect are described in more detail with reference to the drawings, therein.

DETAILED DESCRIPTION OF EMBODIMENTS

Figure 1:
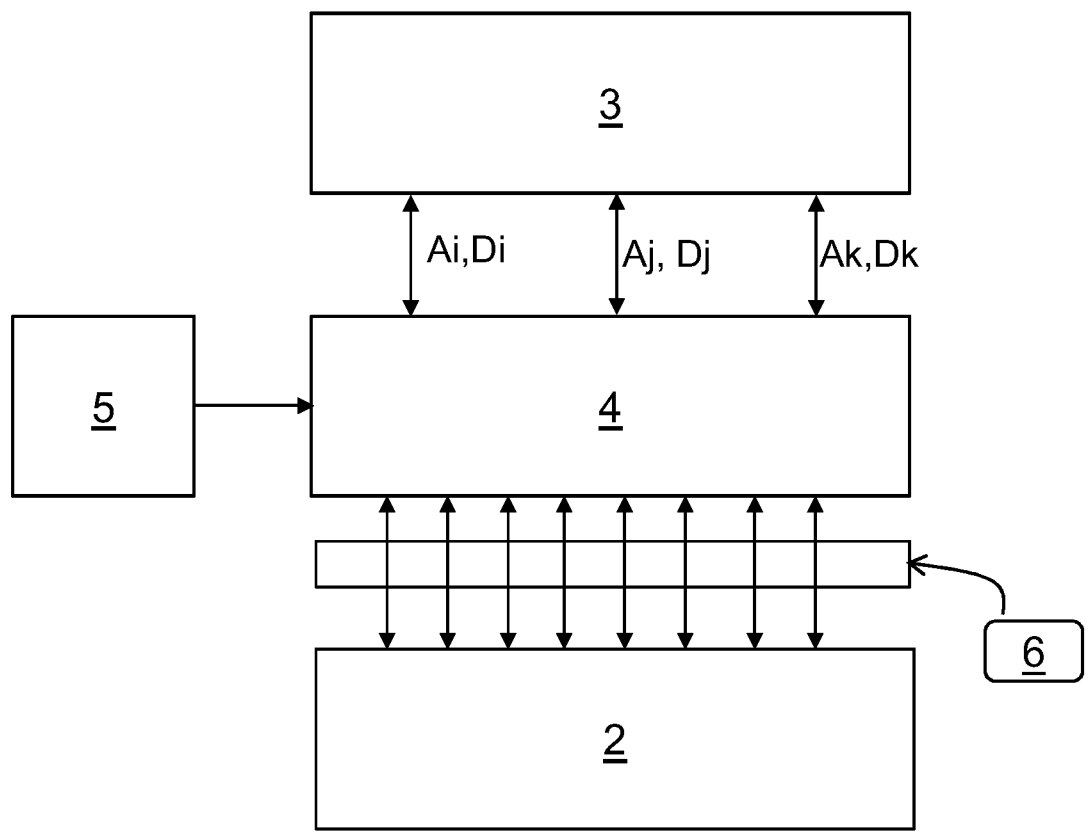
FIG. 1 schematically shows a neural network device according to an embodiment of the present disclosure.
Figure 1:

FIG. 1 schematically shows a neural network device 1 that comprises a physical memory 2, a data processor core 3, a configurable memory mapping unit 4, a configuration module 5 and a memory-interface module 6.

Figure 2:
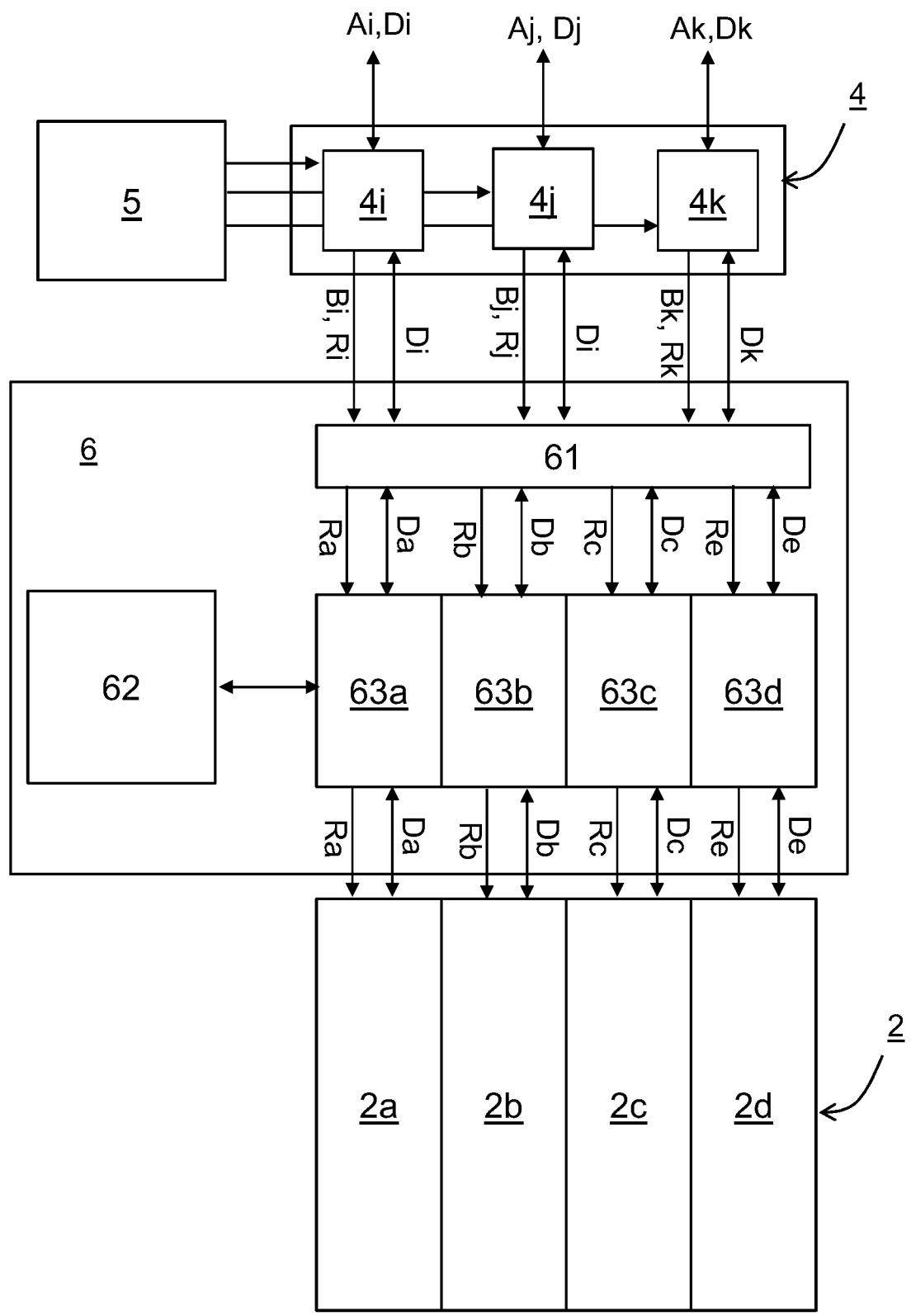
FIG. 2 shows parts of the embodiment of FIG. 1 in more detail.

As shown in more detail in FIG. 2, the physical memory 2 has a plurality M of independently accessible memory banks. In the explanatory example shown in FIG. 2, the plurality M is equal to 4 and the four independently accessible memory banks are denoted as 2a, 2b, 2c, 2d in FIG. 2.

The data processor core 3 is configured to execute instructions of an instruction set. One or more of the instructions involve multiple memory access operations specifying respective logical memory addresses in respective logical memories within the physical memory 2. The instruction set may comprise further instructions, e.g. instructions that do not require a memory access or instructions that only request access to a single logical memory. In the example shown in FIG. 2, the data processor core 3 executes an instruction that specifies three logical memory addresses Ai, Aj, Ak in respective logical memories within the physical memory 2. An access requests may be a load operation requesting that data Di, Dj, Dk is read from the physical address corresponding to the specified logical memory address Ai, Aj, Ak, or a store operation requesting that data Di, Dj, Dk is written to the physical address corresponding to the specified logical memory address Ai, Aj, Ak. Still further an access requests may be a read-modify-write operation requesting that data is read from the physical address corresponding to the specified logical memory address and be written back to the same physical address after the data is modified by the operation performed by the data processor core 3. Whereas in this example, the data processor core 3 executes an instruction that specifies three logical memory addresses other examples are conceivable, wherein the instruction specifies a smaller or larger number of logical memory addresses.

The configurable memory mapping unit 4 maps a logical memory address A to a physical address. The physical address including an indication of a memory bank B of the plurality of memory banks and a row address R within the indicated memory bank.

In a configuration stage, the configuration module 5 determines the particular configuration of the configurable memory mapping unit for a particular application, and this configuration is maintained during run-time when the application is executed by the neural network device 1. As noted above, configuration module 5 may operate automatically, may be operated by a user providing the application or may operate semi-automatically.

The memory-interface module 6 facilitates memory access operations for mutually different logical memories configured in the physical memory, depending on the way the physical memory is configured.

In the embodiment shown in FIG. 2 the configurable memory mapping unit 4 comprises a respective mapping component 4i, 4j, 4k for each logical memory. It is noted that it is not necessary that an instruction executed by the processor core 3 accesses each of the logical memories. In the example shown, a first one 4i of the mapping components maps the logical memory address Ai to the physical address defined by memory bank Bi of the plurality of memory banks and a row address Ri within the memory bank Bi. Similarly, a second one 4j of the mapping components maps the logical memory address Aj to the physical address defined by memory bank Bj of the plurality of memory banks and a row address Rj within the memory bank Bj. Likewise, a third one 4k of the mapping components maps the logical memory address Ak to the physical address defined by memory bank Bk of the plurality of memory banks and a row address Rk within the memory bank Bk.

The memory-interface module 6 then provides for a routing of the memory access request to the corresponding physical memory bank. In one example, memory banks 2a, 2b are both assigned to a first one of the logic memories and memory banks 2c, 2d are respectively assigned to a second and third one of the logic memories. In this example the memory bank Bi to which the first logic address Ai is mapped is one of the banks 2a, 2b, and the memory banks Bj, Bk to which the second and the third logic address Aj, Ak are mapped are the banks 2c, 2d respectively. The assignment of the memory banks to the logical memories is dependent on the configuration. To that end, the memory-interface module 6 comprises a routing unit 61 to provide for a routing of the physical memory access request specified by the bank B and the row address R to the specified bank.

In this example, the configurable memory mapping unit 4 enables assigning respective sets of banks to respective logical memories and the assignment is provided accordingly. I.e. banks 2a, 2b are exclusively assigned to the first logic memory, and banks 2c, 2d are exclusively assigned to the second and the third logic memory. Therewith it should never occur that access requests to mutually different logic memories conflict in that they need to access a same memory bank. As a precaution, the routing unit 61 may be configured to verify that each physical memory access request from the memory mapping unit 4 complies with the configuration defined by the configuration module 5, and issue a run-time error upon detecting non-compliance.

Figure 3:
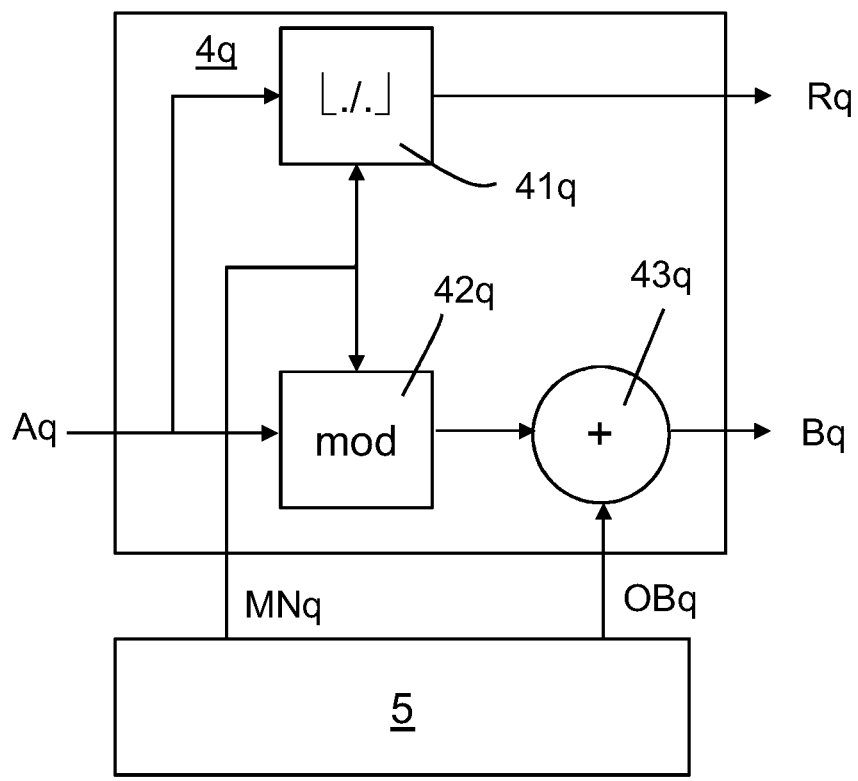
FIG. 3 shows a first variation of components of the embodiment of FIG. 1.

FIG. 3 shows in more detail a component $4q$ of a configurable memory mapping unit 4 that exclusively enables assigning respective sets of banks to respective logical memories.

A logical memory address $Aq$ of logical memory $q$ is mapped to row $Rq$ of bank $Bq$ of the physical memory 2. Therein blocks $42q$ and $43q$ compute the bank number as:

$$Bq = Aq \bmod MNq + OBq$$

Therein the banks assigned to the logical memory $q$ by the configuration module 5 are $OBq, \ldots, OBq+MNq-1$
Block $41q$ compute the row address $Rq$ as:

$$Rq = \lfloor LAq/MNq \rfloor$$

In the example presented above, the values $OBq$ and $MNq$ for the logic memories i, j and k are:
OBi=1, MNi=2
OBj=3, MNj=1
OBj=4, MNj=1

Figure 4:
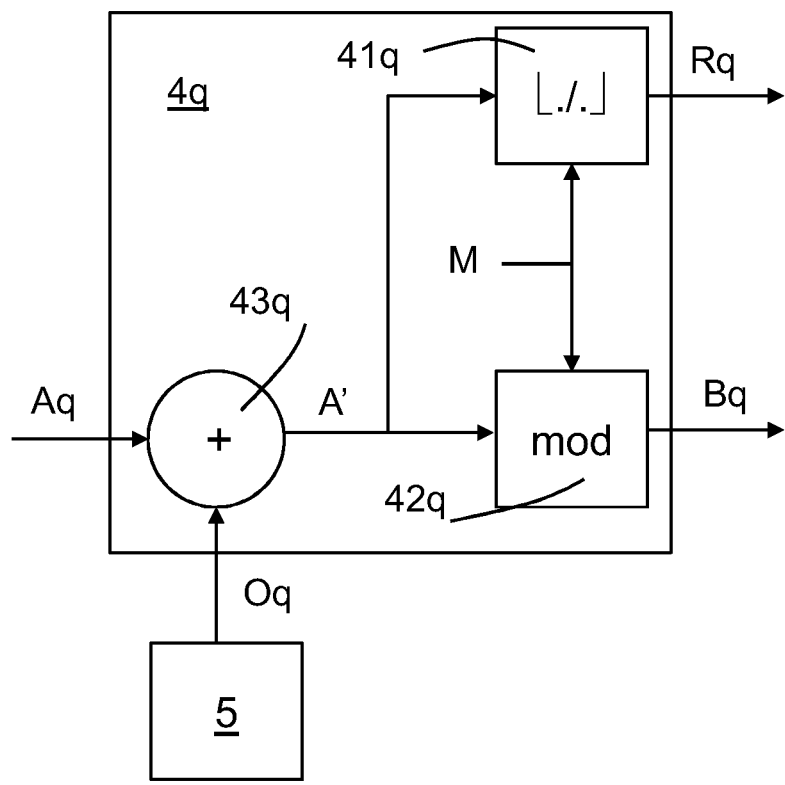
FIG. 4 shows a second variation of components of the embodiment of FIG. 1.

In another example, the neural network device the configurable memory mapping unit 4 enables assigning respective address ranges within a bank to respective logical memories. FIG. 4 shows in more detail a component $4q$ of a configurable memory mapping unit 4 that exclusively enables assigning respective address ranges within a bank to respective logical memories.

In this case blocks $42q$ and $43q$ compute the bank number Bq as:

$$Bq = (Aq + Oq) \bmod M,$$

The row address within the bank with number Bq is computed as:

$$Rq = \lfloor Aq/M \rfloor$$

Therein M is the number of banks (4 in the example of FIG. 2) and Oq is an offset specified for each logical memory. The offset Oq should be selected during the configuration such that for each q>1: $O_{q+1} > Aq + Oq$. With this requirement, the logical memories have proper, mutually non-overlapping address ranges available in the physical memory During run-time, the memory-interface module 6 facilitates memory access operations for respective logical memories to the respective assigned address ranges. Although the address ranges assigned to the logic memories in the physical memory are mutually non-overlapping, it may happen that an access conflict occurs, i.e. two or more logic-memory access operations require access to a same memory bank in a same time-slot associated with execution of an instruction with multiple memory access operations. One option to address this issue is to perform the instruction in a plurality of clock cycles, wherein the individual access operation are successively performed. The execution of such an instruction in multiple clock cycles may be scheduled in a static manner or in a dynamic manner. In case of a static scheduling the instruction is always scheduled to be performed in a fixed number of clock cycles. The fixed number is the number that is sufficient to serialize all potentially conflicting memory access operations. If for example the instruction needs access to 5 logical memories that could potentially require access to the same memory bank, the instruction is statically scheduled to be performed in 5 clock cycles. In case of a dynamic scheduling, it is dynamically determined how many clock cycles are necessary to serialize actually conflicting memory access operations. If all memory access requests are directed to mutually different banks, the instruction can be executed in a single clock cycle. The probability that a conflict occurs will be lower if the number of available banks is higher.

In the embodiment shown in FIG. 2, the memory interface module 6 comprises an arbitration module 62, 63a, ..., 63d. The arbitration module comprises a priority designation component 62 that assigns a priority indicative for the order in which access requests to a same memory bank are to be performed. In the embodiment shown, the memory-interface module 6 also comprises a respective buffer $63a, \ldots, 63d$ for each memory bank $2a, \ldots, 2d$. Non conflicting memory access requests or memory access requests having the highest priority are executed immediately. Lower prioritized memory access requests are buffered in the buffer of the memory bank for which access is requested. It is sufficient that the arbitration module 6 dynamically schedules execution of mutually conflicting access request in arbitrary order. Therewith all requests can be properly handled. In an embodiment, the memory-interface module (6) assigns a lower priority to store operation in case it concurs with a load operation requesting access to the same bank. In that case it buffers the store operation Therewith it is achieved that the load operation in the instruction can be immediately performed, so that the requested data is rapidly retrieved from the memory bank. Furthermore the process of execution of the instruction does not need to be delayed by the buffered store operation as the store operation can be completed later during execution of further instructions.

As noted above, the configuration module assigns a proper physical memory section to each logical memory in accordance with the application to be executed. Nevertheless, as a precaution the memory mapping unit 4 or the memory-interface module 6 may verify during run-time that access requests comply with the assignment by the configuration module, and issue an error message if this is not the case.

With reference to FIGS. 3 and 4, two approaches were described to flexibly configure a physical memory of a neural network device (1) as a shared storage space for a plurality of logical memories.

According to the first approach as described with reference to FIG. 3, the respective (sets of) banks of a physical memory are assigned to respective logical memories. This approach has the advantage that access conflicts are avoided to occur at all. Provided that a sufficiently large number of memory banks is available, also a fine grained partitioning of the physical memory is possible. Whereas in the example of FIG. 2 only four banks are available, allowing a very course configuration wherein only for one logical memory may be assigned two instead of one bank, it may be contemplated to increase the number of memory banks, so that a substantially larger range of possibilities is available to partition the physical memory.

According to the second approach as described with reference to FIG. 4, the configurable memory mapping unit 5 enables assigning respective address ranges within a bank to respective logical memories. It is an advantage of this second approach that a partitioning of the physical memory into sections assigned to logic memories can be achieved in a very fine grained manner, even if the number of memory banks is relatively small, even if only one bank is available. In this second approach additional measures are required to avoid memory access conflicts. Examples of these measures are a static scheduling of memory access operations in an instruction, a dynamic scheduling of memory access operations in an instruction, buffering of memory access operations, prioritizing memory access operations, advantageously by prioritizing load operations over store operations.

Apart from these approaches, also a hybrid approach is possible wherein the physical memory is partitioned both in terms of memory banks and in terms of address ranges within memory banks. This approach is described with reference to FIG. 5.

In this case blocks 42q, 43q and 44q compute the bank number Bq as:

$Bq=(Aq+Oq) \bmod MNq+OBq,$

With blocks 41q and 44q, the row address within the bank with number Bq is computed as:

$Rq=\lfloor (Aq+Oq)/MNq \rfloor$

In a possible configuration of the example of FIG. 2, having 3 logic memories and a physical memory 2 with four banks 2a, ..., 2d, the first logic memory is assigned the first two memory banks of the physical memory and the other two logic memories share the remaining two memories. This can be achieved with the following selection of the configuration parameters Oq, MNq and OBq:

| Logic memory | Oq | MNq | OBq |
|---|---|---|---|
| 1 | 1 | 2 | 1 |
| 2 | 1 | 2 | 3 |
| 3 | O3 | 2 | 3 |

Herein O3 is the offset that determines which section of the last two memory banks is reserved for the third logic memory.

It is an advantage of this hybrid embodiment that a large range of configuration options is available, while it is possible to fully avoid memory access conflicts for specific logic memories.

Figure 6:
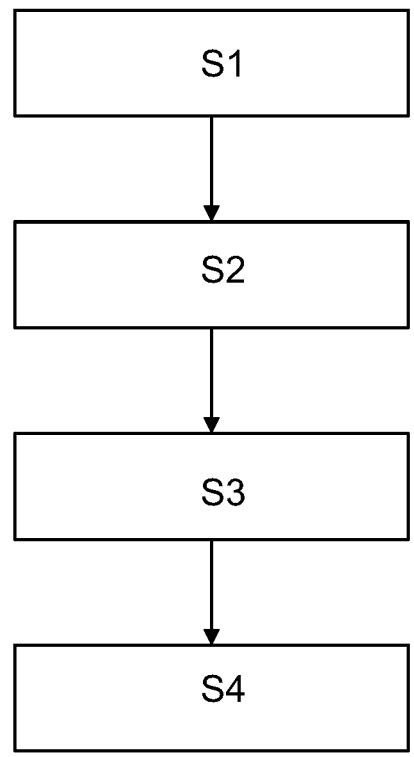
FIG. 6 shows a neural network method according to an embodiment of the present disclosure.

FIG. 6 schematically shows a neural network processing method.

In step S1 of the method, a physical memory 2 is configured by assigning respective sections of the physical memory to respective logical memories. In some examples, the sections are respective sets of one or more memory banks that are assigned to each logical memory. Alternatively the sections are respective address ranges that are assigned to each logical memory. As an other example, a hybrid approach is used, wherein for example a subset of the memory banks of the physical memory is assigned to two or more of the logical memories, which two or more logic memories each use a proper address range within each memory banks of the subset. Likewise other logic memories may share another subset of the memory banks, i.e. each of the other logic memories is allowed to use a proper address range to each memory bank in that another subset. Alternatively, it may be the case that the other logic memories are each assigned a proper memory bank.

In step S2 a memory mapping unit 4 is configured to map respective logical memory addresses to respective physical address in the shared physical memory 2 with a plurality of independently accessible memory banks 2a, ..., 2d for example. That is, the memory mapping unit 4 is configured to convert a logical memory address to a physical address in the shared physical memory in accordance with the configuration determined in step S1.

After the configuration steps S1, S2 are completed for a particular application, the application is executed.

In step S3, a data processor core 3 executes at least one instruction that involves multiple memory access operations specifying respective memory addresses in respective logical memories. Typically, the data processor core executes a sequence of instructions selected from an instruction set. The instruction set may also contain instructions that do not require access to a logical memory, or instructions that only need access to a single logical memory.

In step S4, the memory mapping unit 4 configured in step S2 maps the respective memory addresses specified in the at least one instruction to a corresponding physical memory address including a designation of a memory bank in the physical memory and an address in the memory bank.

Figure 5:
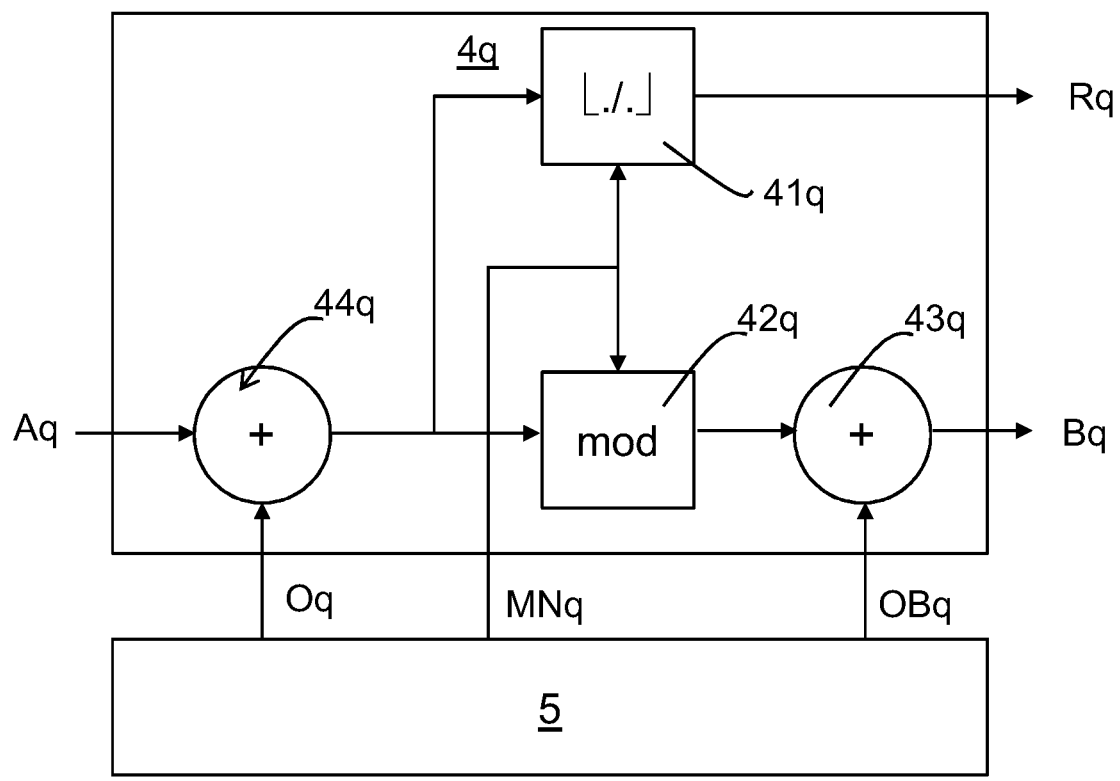
FIG. 5 shows a third variation of components of the embodiment of FIG. 1.

Examples are presented in FIGS. 3, 4 and 5. It is noted that a configuration unit 5 as shown in FIG. 5, does not necessarily always configure the memory mapping unit 4 in a hybrid manner. For some applications it may for example configure the memory mapping unit 4 in the same way as in the example of FIG. 3, i.e. by assigning respective sets of one or more banks to each logical memory. Alternatively, for other applications it may for example configure the memory mapping unit 4 in the same way as in the example of FIG. 4, i.e. by assigning respective address ranges of a bank to each logical memory.

Figure 7:
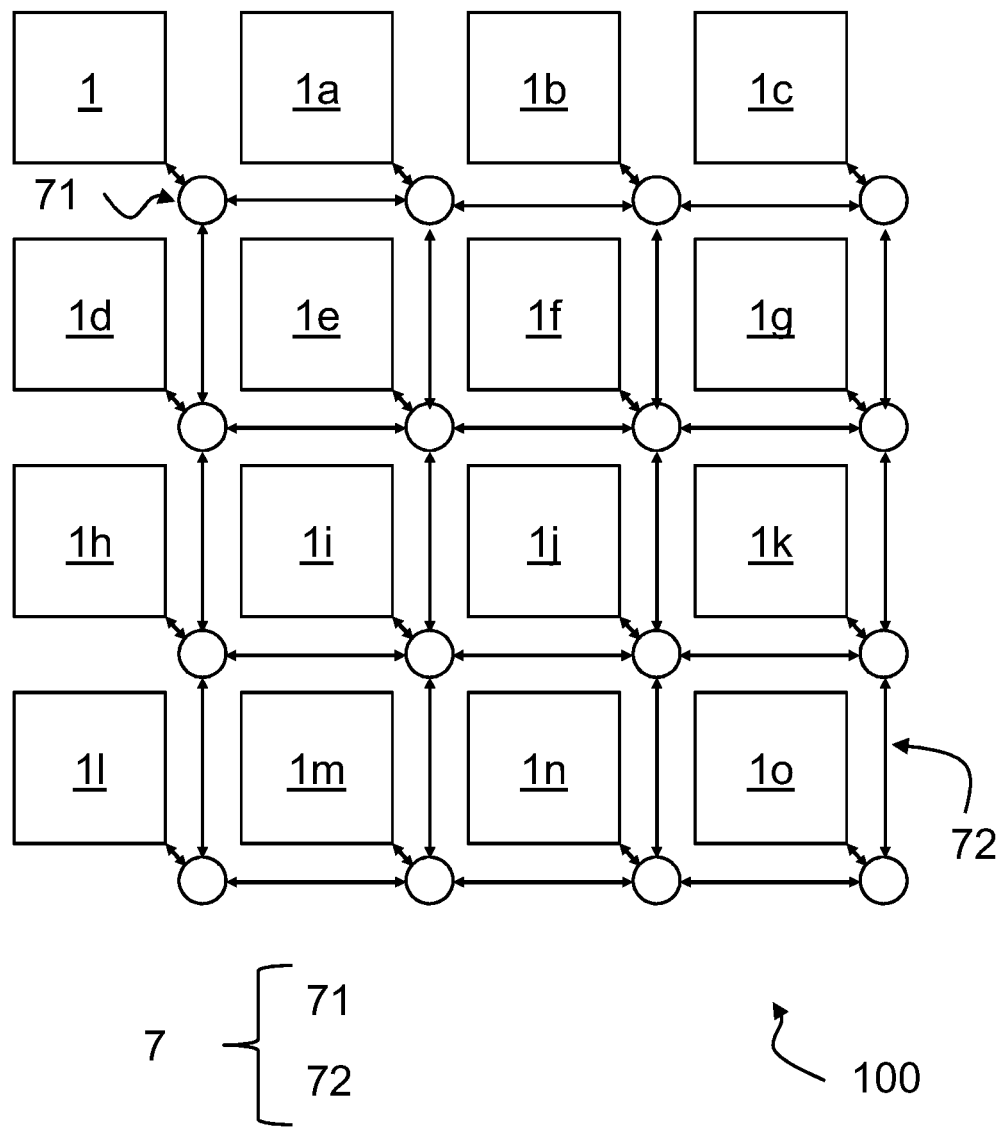
FIG. 7 shows a neural network system according to an embodiment of the present disclosure.

A neural network device 1 may be part of a neural network system 100 as depicted in FIG. 7. The neural network system 100 shown therein comprises in addition to the neural network device 1 a plurality of other neural network device 1a, ..., 1o, as well as a message exchange network 7 comprising respective network nodes 71 for each neural network device and network links 72 coupling the network nodes 71. The message exchange network 7 enables the neural network devices 1, 1a, ..., 1o to exchange messages. Examples of such messages are event-messages indicating that a neural network element of a neural network device "fires". The message serves as an input to one or more addressed a neural network elements of a recipient neural network device in the network. Event messages directed to a neural network elements of a same neural network device may be handled by that neural network device therewith bypassing the message exchange network 7. Alternatively handling these messages may involve the message exchange network 7, for example to use facilities offered by the message exchange network 7, for example buffering and controllable delay. Also other message exchange network architectures may be contemplated, comprising respective clusters of neural network devices. Also a message exchange network architecture may be contemplated wherein the neural network devices are clustered in layers, wherein each neural network device, except the last one can send messages to a neural network device in a next layer in the sequence.

It is noted that a component or module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components or modules at different times. Software may accordingly configure a processor, for example, to constitute a particular component or module at one instance of time and to constitute a different component or module at a different instance of time.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention claimed is:

1. A neural network device comprising:
   a shared physical memory comprising a plurality of independently accessible memory sections; and
   a data processor core to execute instructions comprising:
      at least one instruction that includes, in response to an event message, performing multiple memory access operations that specify respective logical memory addresses in a plurality of logical memories and causes updating of a state value of a neural network component to obtain an updated state value, the multiple memory access operations comprising accessing a first storage location storing a weight to weigh the event message and accessing a second storage location to read a current state value of the neural network component and write the updated state value, the first storage location being of a first logical memory of the plurality of logical memories that stores weight data, and the second storage location being of a second logical memory of the plurality of logical memories that stores state data, each logical memory address of the respective logical memory addresses being mapped, based on a configuration associated with a particular application that is to be maintained during runtime, to a physical address by providing an indication of a memory section of the plurality of independently accessible memory sections and a row address within the memory section, and a configuration stage in which the configuration is applied comprising assigning respective memory sections of the plurality of independently accessible memory sections of the shared physical memory to respective logical memories of the plurality of logical memories.

2. The neural network device of claim 1, wherein the plurality of independently accessible memory sections comprises independently accessible memory banks, and the assigning comprises assigning respective sets of the independently accessible memory banks to the respective logical memories.

3. The neural network device of claim 1, wherein the plurality of independently accessible memory sections comprises independently accessible memory banks, the assigning comprises assigning respective address ranges within the independently accessible memory banks to the respective logical memories, and concurrent access requests associated with a same memory bank of the independently accessible memory banks are serialized.

4. The neural network device of claim 1, wherein the plurality of independently accessible memory sections comprises single ported memory units.

5. The neural network device of claim 1, wherein the plurality of independently accessible memory sections is provided by identical memory units.

6. The neural network device of claim 1, further comprising a respective buffer for each of the plurality of independently accessible memory sections.

7. The neural network device of claim 1, wherein a load operation is prioritized over a store operation in response to concurrent access requests for the load operation and the store operation.

8. The neural network device of claim 1, wherein the at least one instruction comprises an instruction in which data words located contiguously in a logical memory of the plurality of logical memories are accessed in a single memory cycle.

9. The neural network device of claim 1, wherein the at least one instruction comprises an instruction that performs loading and storing of a plurality of data words in parallel using a single logical memory address of the respective logical memory addresses.

10. A neural network processing method comprising:
    assigning, during a configuration stage, respective memory sections of a plurality of independently accessible memory sections of a shared physical memory of a neural network device to respective logical memories of a plurality of logical memories to apply a configuration associated with a particular application that is to be maintained during runtime; and
    executing, by a data processor core of the neural network device, at least one instruction that includes, in response to an event message, performing multiple memory access operations that specify respective logical memory addresses in the plurality of logical memories and causes updating of a state value of a neural network component to obtain an updated state value, the multiple memory access operations comprising accessing a first storage location storing a weight to weigh the event message and accessing a second storage location to read a current state value of the neural network component and write the updated state value, the first storage location being of a first logical memory of the plurality of logical memories that stores weight data, and the second storage location being of a second logical memory of the plurality of logical memories that stores state data, and each logical memory address of the respective logical memory addresses being mapped, based on the configuration, to a physical address by providing an indication of a memory section of the plurality of independently accessible memory sections and a row address within the memory section.

11. The neural network processing method of claim 10, wherein the plurality of independently accessible memory sections comprises independently accessible memory banks, and the assigning comprises assigning respective sets of the independently accessible memory banks to the respective logical memories.

12. The neural network processing method of claim 10, wherein the plurality of independently accessible memory sections comprises independently accessible memory banks, the assigning comprises assigning respective address ranges within the independently accessible memory banks to the respective logical memories, and concurrent access requests associated with a same memory bank of the independently accessible memory banks are serialized.

13. The neural network processing method of claim 10, wherein the plurality of independently accessible memory sections comprises single ported memory units.

14. The neural network processing method of claim 10, wherein the plurality of independently accessible memory sections is provided by identical memory units.

15. The neural network processing method of claim 10, wherein the neural network device comprises a respective buffer for each of the plurality of independently accessible memory sections, the neural network processing method comprising using a buffer of the respective buffers to temporarily buffer a memory access request to an independent accessible memory section associated with the buffer.

16. The neural network processing method of claim 10, further comprising automatically prioritizing a load operation over a store operation in response to concurrent access requests for the load operation and the store operation.

17. The neural network processing method of claim 10, wherein the at least one instruction comprises an instruction in which data words located contiguously in a logical memory of the plurality of logical memories are accessed in a single memory cycle.

18. The neural network processing method of claim 10, wherein the at least one instruction comprises an instruction that performs loading and storing of a plurality of data words in parallel using a single logical memory address of the respective logical memory addresses.

19. A neural network system comprising a plurality of neural network devices, each neural network device comprising:
  a shared physical memory comprising a plurality of independently accessible memory sections; and
  a data processor core to execute instructions comprising:
    at least one instruction that includes, in response to an event message, performing multiple memory access operations that specify respective logical memory addresses in a plurality of logical memories and causes updating of a state value of a neural network component to obtain an updated state value, the multiple memory access operations comprising accessing a first storage location storing a weight to weigh the event message and accessing a second storage location to read a current state value of the neural network component and write the updated state value, the first storage location being of a first logical memory of the plurality of logical memories that stores weight data, and the second storage location being of a second logical memory of the plurality of logical memories that stores state data, each logical memory address of the respective logical memory addresses being mapped, based on a configuration associated with a particular application that is to be maintained during runtime, to a physical address by providing an indication of a memory section of the plurality of independently accessible memory sections and a row address within the memory section, and a configuration stage in which the configuration is applied comprising assigning respective memory sections of the plurality of independently accessible memory sections of the shared physical memory to respective logical memories of the plurality of logical memories.

20. The neural network system of claim 19, further comprising a message exchange network with a respective network node for each neural network device.

* * * * *